(12) United States Patent
Bruck

(10) Patent No.: US 10,500,663 B2
(45) Date of Patent: Dec. 10, 2019

(54) METHOD OF TIGHT CRACK BRAZE REPAIR USING ACOUSTICS

(71) Applicant: SIEMENS ENERGY, INC., Orlando, FL (US)

(72) Inventor: Gerald J. Bruck, Myrtle Beach, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 308 days.

(21) Appl. No.: 15/252,887

(22) Filed: Aug. 31, 2016

(65) Prior Publication Data

US 2018/0056459 A1   Mar. 1, 2018

(51) Int. Cl.
| | |
|---|---|
| B23K 1/00 | (2006.01) |
| B23K 1/018 | (2006.01) |
| B23K 1/06 | (2006.01) |
| B23K 1/20 | (2006.01) |
| B23P 6/04 | (2006.01) |
| B23K 1/002 | (2006.01) |

(52) U.S. Cl.
CPC .............. B23K 1/018 (2013.01); B23K 1/002 (2013.01); B23K 1/0004 (2013.01); B23K 1/0018 (2013.01); B23K 1/06 (2013.01); B23K 1/206 (2013.01); B23P 6/045 (2013.01)

(58) Field of Classification Search
CPC ............ B23K 1/0018; B23K 2101/001; B23K 35/0244; B23K 1/00; B23K 1/002
USPC .............................. 228/119, 175, 176, 248.1
See application file for complete search history.

(56) References Cited

U.S. PATENT DOCUMENTS

| 2010/0237134 | A1* | 9/2010 | Bucci | B22F 7/062 |
| | | | | 228/119 |
| 2012/0096713 | A1* | 4/2012 | Manjooran | B23P 6/007 |
| | | | | 29/889.1 |
| 2016/0059364 | A1* | 3/2016 | Huxol | B23P 6/007 |
| | | | | 415/208.1 |

FOREIGN PATENT DOCUMENTS

| DE | 10336390 | A1 * | 3/2005 | ............... B08B 7/02 |
| JP | 54117542 | A  * | 9/1979 | |

OTHER PUBLICATIONS

Computer english translation DE-10336390-A1 (Year: 2003).*

* cited by examiner

*Primary Examiner* — Erin B Saad

(57) ABSTRACT

A method for braze repair of tight cracks in a superalloy component is provided. The method includes directing energy, e.g., from an acoustic energy source, towards surfaces of the tight crack to break up one or more contaminants, corrosion products, or oxides at the surface. The directed energy may cause opposed walls of the tight crack to vibrate to break up the oxides, and to generate a modest heat for allowing infiltration of the tight crack with a braze material. The braze material is then melted at a melt temperature of the braze material but below the melt temperature of the component. The braze material is then solidified to repair the tight crack.

17 Claims, 2 Drawing Sheets

METHOD OF TIGHT CRACK BRAZE REPAIR USING ACOUSTICS

TECHNICAL FIELD

The present disclosure relates generally to the field of materials technology, and more particularly, to processes for repairing tight cracks in components of a turbomachine engine.

BACKGROUND

Braze repair of cracks in superalloy components is made difficult by oxides, e.g., Cr, Al and Ti, corrosion products (of e.g., sulfidation attack) and contaminants on the surfaces of the cracks. Braze does not wet and infiltrate such cracks if oxides and other constituents are present. Vacuum furnace, hydrogen furnace and fluoride ion cleaning (FIC) each can help remove (reduce) the surface materials if crack surfaces are exposed, but extremely tight cracks make access for such cleaning and subsequent wetting of braze alloy especially difficult. Therefore, a need remains for a process to braze repair the tight cracks in superalloy components.

SUMMARY

In one exemplary embodiment, a method for repairing tight cracks, also referred to herein as extremely tight cracks, in a superalloy component is provided. The method includes at least the step of vibrating opposed side walls of the tight crack in the component to break up one or more contaminants, corrosion products, and/or oxides at a surface of the crack. The method further includes the step of applying a braze material to the surface of the component proximate or at the tight crack, and working the braze material into the tight crack to fill the same. The method further includes heating the superalloy component, and particularly, at least opposed surfaces of the tight crack to a melt temperature of the braze material but below a melt temperature of the superalloy component to repair the tight crack with the braze material.

In another exemplary embodiment, a method for braze repair of a superalloy component includes the step of directing acoustic energy towards a surface of a tight crack in the component to break up one or more contaminants, corrosion products, or oxides at the surface or in the tight crack. The method also includes vibrating opposed walls of the tight crack to generate heat for infiltrating the tight crack with a braze material. The method further includes melting the braze material at a melt temperature below the melt temperature of the component, and solidifying the braze material to repair the tight crack in the component.

DETAILED DESCRIPTION

The present disclosure provides a method to infiltrate tight cracks, also referred to as extremely tight cracks, with a filler material, e.g., a braze filler material or the like, to achieve repairing of superalloy components with contaminants, corrosion products, and/or oxides on a surface of the component, and more particularly, a surface of the tight crack.

Figure 1:
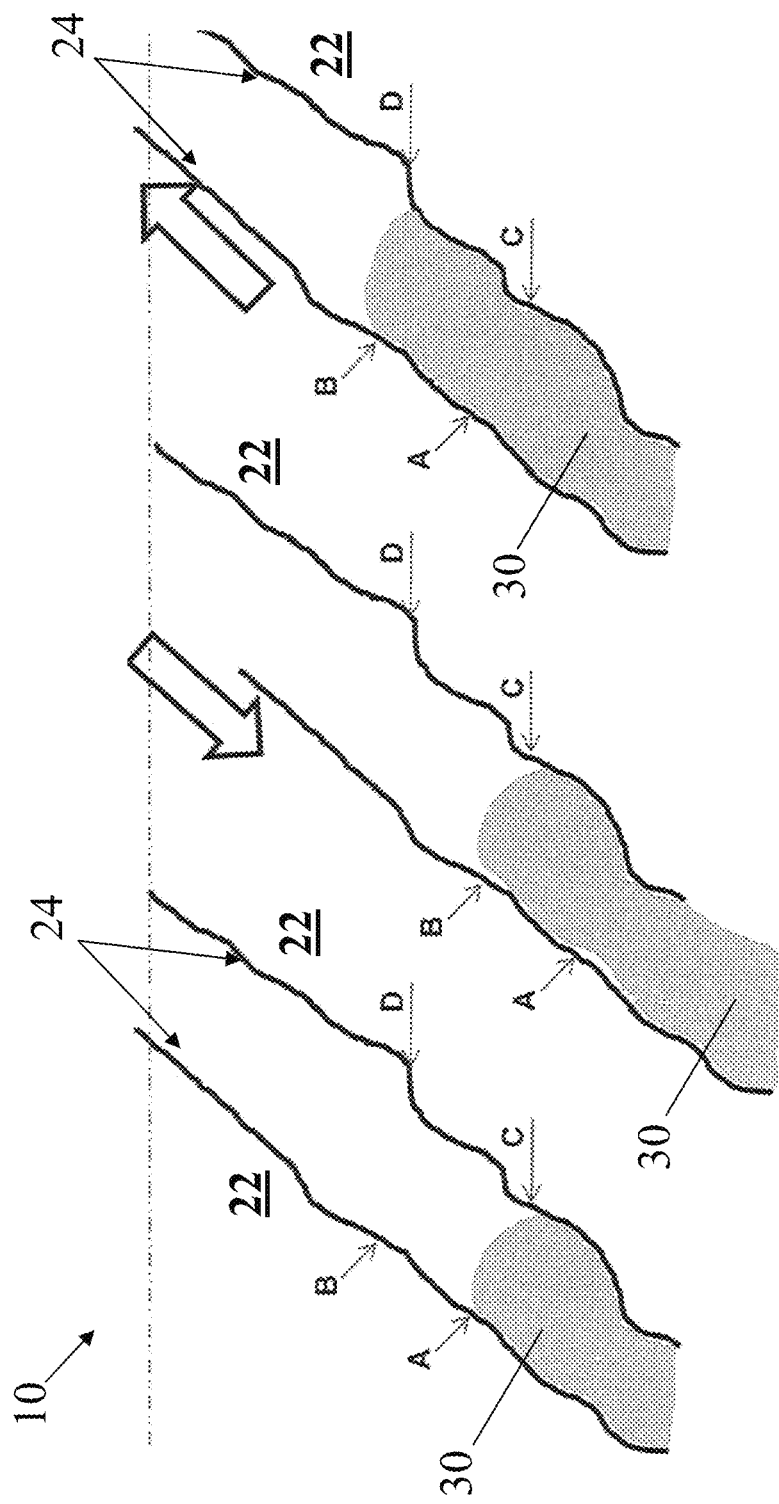
FIG. 1 illustrates a perspective view of tight cracks in a superalloy component, in accordance with the disclosure provided herein.
Figure 2:
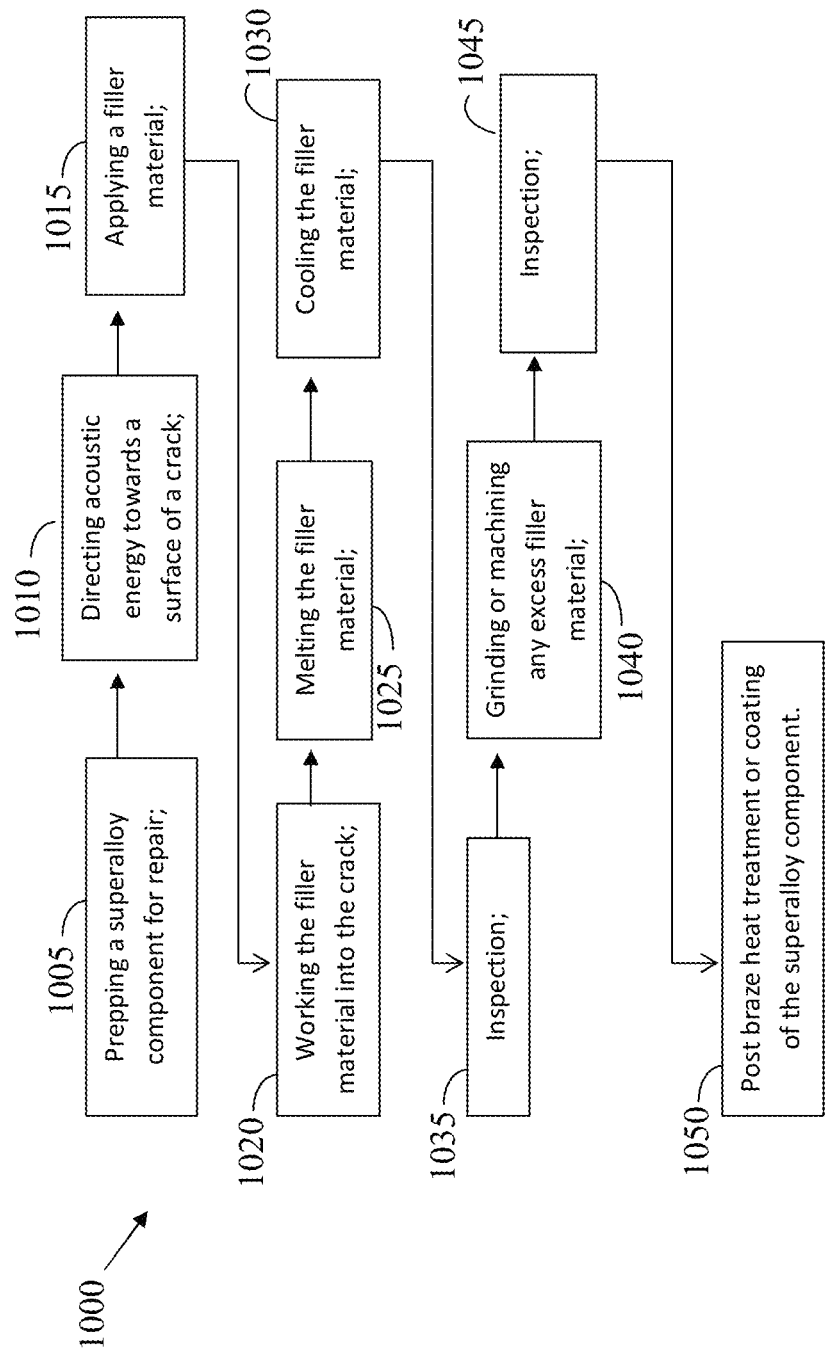
FIG. 2 is a flowchart of an embodiment of a method for braze repair of a superalloy component, in accordance with the disclosure provided herein.

Referring now to the drawings wherein the showings are for purposes of illustrating embodiments of the subject matter herein only and not for limiting the same, FIG. 1 shows a perspective view of tight cracks 20 in a superalloy component 10. FIG. 2 shows a flowchart of a method 1000 for repairing the tight crack 20 of the superalloy component 10 with a braze filler material 30 using acoustic energy, e.g., from an acoustic transducer or similar device configured to distribute or project acoustic energy therefrom and known to persons of ordinary skill in the art.

In one exemplary embodiment, the method 1000 may include the step of prepping the superalloy component 10 for subsequent repair of any identified tight cracks 20 using the braze filler material 30 (1005). In this step, a vacuum furnace, hydrogen furnace and/or fluoride ion cleaning (FIC) may be utilized to assist in removing or reducing the surface materials of the superalloy component 10. It should be appreciated, however, that this surface cleaning is not sufficient to reduce or remove surface materials of the extremely tight cracks due to the size of the cracks and difficulty in accessing the same. It should further be appreciated that attempts to extend these cleaning methods, e.g., long duration FIC cleaning, is not recommended, as such extensive or repeated application is known in the art to compromise the integrity of the superalloy component 10, e.g., resulting in elemental depletion and alloy property degradation.

Accordingly, the method 1000 may further include the step of vibrating one or more side walls 24 of the tight crack 20 in the superalloy component to break up one or more contaminants, corrosion products, or oxides on a surface 22 of the tight crack 20 (1010). In this step, the acoustic transducer may direct the acoustic energy towards the surface 22 of the tight crack 20 to promote breaking up the contaminants and oxides. In one embodiment, the acoustic energy may cause the surface 22 and/or side walls 24 to vibrate and/or rub, resulting in the contaminants and oxides thereon being broken up, e.g., in to a powder-like material and even potentially resulting in some smoothening of the opposing walls of the crack.

The method 1000 may further include the step of applying the braze material 30 to the surface 22 at or proximate to the tight crack for working the braze material into the tight crack 20 (1015). In yet another exemplary embodiment, additionally or alternatively, the braze material 30 may be applied prior to directing the acoustic energy towards the surface 22. For example, in one embodiment, the component 10 may be submerged in the braze material 30 while the acoustic energy is being used for breaking up the contaminants and oxides.

It should be appreciated that because the tight crack 20 is extremely small, the braze material 30 may be sized such that it may fit between the walls 24 of the crack 20. In one exemplary embodiment, the braze material may comprise a similar composition to that of the superalloy component 10. For example, with a nickel base alloy component, the braze material 30 formulation may comprise a powdered superalloy of having a nickel base. Additionally or alternatively, the braze material 10 may further comprise a melting point suppressant, e.g., a boron, silicon, or similar suppressant known in the art which can be mixed with superalloy to form the braze material 30 or can be included as a conglomerate constituent or alloyed element within powdered material. It should be appreciated, that the melting point suppressant may also be fine like the braze material 30 such that it does not limit the ability of the braze material 30 to infiltrate the tight crack 20.

With continued reference to the figures, and to facilitate working the braze material 30 into the tight crack, the acoustic energy may be provided by, e.g., an ultrasonic piezoelectric device. In this embodiment, the acoustic energy may be transferred through a probe tip such as a horn which includes a face for engaging the surface 22. Upon directing the acoustic energy towards the surface 22, a friction within the crack 20 may occur, e.g., rubbing of opposed walls 24, which may cause the contaminants or oxides within the crack to dislodge from the surface 22 or other part of the crack 20 or component 10, e.g., the metal surface, which may allow for the braze material 30 deposited within the crack to wet and attach to the surface for brazing of the material 30 to repair the crack 20.

It should be further appreciated that the energy transferred from the device may cause a localized heating in an area surrounding the crack 20. The localized heating may provide a modest heating, e.g., of opposed surfaces 22, sufficient to help to melt, i.e., to work, the braze material 30 into the tight crack 20. It should be appreciated that the localized heating may result from friction resulting from, e.g., the vibrating, rubbing, or relative motions illustrated by the directional arrows in FIG. 1. That is, the relative motion within the crack, e.g., resulting from the acoustic energy (AE), may cause the braze material to spread further into the crack, which may result in a better attachment of the braze material to the metal surface of the component 10.

The method 1000 may further include the step of melting the braze material 30 (1025). In this step, in one exemplary embodiment, the braze material 30 may be heated to a melt temperature of the braze material 30, but below a melt temperature of the superalloy component 10. To melt the braze material, heat may be provided by a torch with fuel-gas flame applied to the component, by induced electric current heating of the component (using a nearby alternating current coil), by electric resistance heating of the component (with component included as a high resistance element of an electric circuit, by dipping the component into a molten bath of braze material, or by insertion of the component with braze in a furnace of various potential atmosphere (vacuum, hydrogen, argon or other).

In an embodiment where the braze material comprises the melting point suppressant, e.g., boron, the suppressant may be diffused away, e.g., into the component while the remaining composition of the braze material remains to solidify.

With continued reference to the figures, the method 1000 may further include the step of cooling the braze material 30 (1030). That is, following braze melting, braze distribution within the crack and (if applicable) melting point suppressant diffusion, the part is allowed to cool. In this step, in one exemplary embodiment, the braze material 30 may be cooled by removal of the source of heat and allowing part to cool passively or by providing active cooling. For example, furnace cooling may be controlled by back purging with relatively cool argon or nitrogen gas. In this embodiment, the cooling of the a portion or the entire component may be conducted in a substantially uniform manner, and relatively slow.

Additionally or alternatively, the method may include the step of inspecting the component 10 at any time during the repair process, e.g., after solidification of the braze material (1035). In this step, a visual inspection may be conducted where appropriate, or if the inspection is following solidification of the braze material or thereafter, the component 10 may be x-rayed to identify the presence of the crack 20 or any further cracks in the component 10. It should be appreciated that additional means of inspection, e.g., dimensional checks, may also be conducted to identify additional cracks or to verify the integrity of the component 10.

In yet another exemplary embodiment, e.g., following inspection of the component 10, if any excess braze material 30 is present on the component, the method 1000 may include the step of grinding, machining, or polishing any excess braze material from the component (1040). A further inspection of the component 10 may then be conducted (1045).

It yet a further exemplary embodiment, additionally or alternatively, the method 1000 may include providing a post braze heat treatment or coating of the superalloy component 10 (1050). Examples of the types of coatings may include a bond coating and/or a thermal barrier coating of the component 10 prior to returning the component 10 to operation.

In yet a further embodiment, the method 1000 may be utilized for grain boundary modification. In this embodiment, grain boundary modification at and near the component 10 surfaces may be achieved via the acoustic energy. The acoustic energy, e.g., the vibratory energy projected from the acoustic source may be sufficient to physically stretch (elastically or plastically) material adjoining a grain boundary, or further to break bonds between adjacent grains. Use of the method 1000 in this regard enables grain boundary precipitates to break up, dissociate and redistribute. Additionally or alternatively, new precipitates may be deposited along grain boundaries. In yet a further exemplary embodiment, the method 1000 may assist in facilitating grain boundaries to migrate, e.g., through the lattice, forming smaller grains or enlarging. Additionally or alternatively, the method 1000 may facilitate the modification of coating interfaces on the component 10 or other substrates.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the terms "comprising", "including", and "having", are open-ended and does not exclude other elements or steps; and the use of articles "a" or "an" does not exclude a plurality.

I claim:

1. A method comprising:
vibrating opposed side walls of a crack in a superalloy component to produce relative movement between the side walls and rubbing between the side walls to break up contaminants;
applying a braze material to a surface of the component proximate to the crack;
working the braze material into the crack to fill the crack; and
heating at least opposed surfaces of the crack to a melt temperature of the braze material but below a melt temperature of the superalloy component.

2. The method of claim 1 further comprising:
solidifying the braze material on the superalloy component.

3. The method of claim 2, wherein the braze material is solidified via cooling the superalloy component in a uniform manner.

4. The method of claim 2 further comprising:
grinding, polishing, or machining any excess braze material from the superalloy component.

5. The method of claim 4 further comprising:
inspecting the superalloy component prior to grinding, polishing, or machining any excess braze material.

6. The method of claim 1, wherein the opposed walls are vibrated via an energy source directed towards at least one of the opposed surfaces of the crack.

7. The method of claim 6, wherein the energy sources is an acoustic energy source.

8. The method of claim 6, wherein the energy source creates a heat energy to work the braze material into the crack.

9. The method of claim 1, wherein the braze material is a fine material sized to infiltrate the crack and comprises a powdered superalloy and a melting point suppressant.

10. A method for braze repair of a superalloy component comprising:
directing acoustic energy towards a first surface of a crack in the component to break up one or more contaminants, corrosion products, or oxides at the surface and to produce relative movement and rubbing between the first surface and a second surface of the crack opposite the first surface;
vibrating one of the first surface and the second surface of the crack to generate heat and relative motion for infiltrating the crack with a braze material;
melting the braze material at a melt temperature below the melt temperature of the component;
solidifying the braze material to repair the crack with the braze material.

11. The method of claim 10 further comprising the step of cosmetically cleaning the component prior to directing the acoustic energy.

12. The method of claim 10, wherein the component is submerged in the braze material prior to directing the acoustic energy.

13. The method of claim 10, wherein the braze material is solidified by cooling the component in a uniform manner.

14. The method of claim 10 further comprising:
inspecting the component for cracks after solidifying the braze material; and
grinding, polishing, or machining any excess braze material from the component upon determining that no cracks are present.

15. The method of claim 10, wherein the acoustic energy is directed to opposed surfaces of the crack to break up one or more contaminants, corrosion products, or oxides at the opposed surfaces.

16. The method of claim 10, wherein the braze material is a fine material sized to infiltrate the crack and comprises a powdered superalloy and a melting point suppressant.

17. The method of claim 10, wherein the relative motion smooths the opposed walls to enhance wetting and infiltration of the crack.

* * * * *